United States Patent
Kronander et al.

(10) Patent No.: US 9,037,175 B2
(45) Date of Patent: May 19, 2015

(54) METHOD AND APPARATUS FOR TRANSMITTING AVAILABLE RADIO ACCESS POSSIBILITIES IN A COMMUNICATIONS AREA

(75) Inventors: Jonas Kronander, Uppsala (SE); Yngve Selén, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1070 days.

(21) Appl. No.: 12/881,901

(22) Filed: Sep. 14, 2010

(65) Prior Publication Data

US 2012/0064930 A1 Mar. 15, 2012

(51) Int. Cl.
 H04B 7/00 (2006.01)
 H04W 48/10 (2009.01)
 H04W 16/14 (2009.01)
(52) U.S. Cl.
 CPC .............. *H04W 48/10* (2013.01); *H04W 16/14* (2013.01)
(58) Field of Classification Search
 CPC . H04W 16/14; H04W 48/10; H04W 36/0033;
  H04W 48/18; H04W 72/005; H04W 84/042;
  H04W 88/10
 See application file for complete search history.

(56) References Cited

U.S. PATENT DOCUMENTS

| 2006/0146807 | A1 | 7/2006 | Codaccioni et al. |
| 2008/0020792 | A1 | 1/2008 | Falk et al. |
| 2010/0202387 | A1 | 8/2010 | Sawai et al. |
| 2010/0203891 | A1 | 8/2010 | Nagaraja et al. |
| 2011/0111764 | A1* | 5/2011 | Mueck et al. ............... 455/452.1 |
| 2011/0263250 | A1* | 10/2011 | Mueck et al. ................. 455/434 |
| 2013/0028128 | A1* | 1/2013 | Novak et al. .................. 370/252 |

FOREIGN PATENT DOCUMENTS

| EP | 1 503 606 | 2/2005 |
| EP | 2 026 514 | 2/2009 |
| EP | 2 111 065 | 10/2009 |

(Continued)

OTHER PUBLICATIONS

The E²R II Flexible Spectrum Management (FSM) Framework and Cognitive Pilot Channel (CPC) Concept—Technical and Business Analysis and Recommendations, End to End Reconfigurability II (E²R II) White Paper—Nov. 7, pp. 1-52.

(Continued)

*Primary Examiner* — Fanghwa Wang
(74) *Attorney, Agent, or Firm* — Nixon & Vanderhye P.C.

(57) ABSTRACT

A local radio access information transmitter (LRAIT) may be used in a communications area serviced by multiple different radio access technologies (RATs) allocated to different radio resources in different locations in the communications area. Each RAT is associated with RAT radio transceiver(s) for serving UEs in the communications area. The LRAIT is in addition to the RAT transceivers and located near a hotspot service area in the communications area. The LRAIT determines local radio access information (LRAI) including different RATs available in the hotspot service area and frequenc(ies) of operation allocated to each RAT in the hotspot service area, sends a registration message to a wide area radio access information controller, and based on a response therefrom, determines what radio resources to use to transmit the LRAI signals. The LRAIT transmits the LRAI signals for receipt by UEs in the hotspot service area using those radio resources.

19 Claims, 7 Drawing Sheets

(56) References Cited

FOREIGN PATENT DOCUMENTS

| GB | 2 452 690 | 3/2009 |
|---|---|---|
| WO | WO 2010/104921 | 9/2010 |

OTHER PUBLICATIONS

International Preliminary Report on Patentability dated Mar. 19, 2013 in International Application No. PCT/SE2011/050971.
Written Opinion of the International Searching Authority mailed Dec. 14, 2011 in International Application No. PCT/SE2011/050971.
International Search Report mailed Dec. 14, 2011 in International Application No. PCT/SE2011/050971.
Leijia Wu et al.; "A Survey on Common Radio Resource Management", Wireless Broadband and Ultra Wideband Communications, AusWireless 2007. The $2^{nd}$ International Conference, pp. 66, Aug. 27-30, 2007.
IEEE Standard for Architectural Building Blocks Enabling Network-Device Distributed Decision Making for Optimized Radio Resource Usage in Heterogeneous Wireless Access Networks, IEEE Standards Coordinating Committee 41, IEEE Std 1900.4™-2009, 131 pages.

* cited by examiner

METHOD AND APPARATUS FOR TRANSMITTING AVAILABLE RADIO ACCESS POSSIBILITIES IN A COMMUNICATIONS AREA

TECHNICAL FIELD

The technical field relates to radio communications, and more particularly, to transmitting available radio access possibilities in a communications area.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Future RANs may look different in that a single UE may be served by multiple RBSs. Each cell is identified by an identity within the local radio area, which is broadcast in the cell. The base stations communicate over the air interface operating on radio frequencies with the user equipment units (UE) within range of the base stations. In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The number of radio access technologies available for uses such as cellular telephony and mobile broadband has grown rapidly in the later years. In the beginning of the 1990's there were only a few standards available, such as NMT, GSM and IS-95, used almost exclusively for voice telephony. Many additional radio access technologies (RATs) have been developed, such as W-CDMA, CDMA2000, EDGE, IEEE 802.16 and LTE, to mention a few. A multi-mode user terminal that can use several different RATs, such as the examples above, obtains improved coverage, e.g., so that users can use their terminals when traveling.

In this heterogeneous RAT environment, there is also a regulatory interest towards increasing flexibility in spectrum allocations with the advantage that the radio environment can be adapted to current usage patterns, and thus, limited radio resources can be more efficiently used. As a result, different RATs may be allocated to different frequencies in different locations, and these allocations may change over time.

FIG. 1 illustrates a heterogeneous RAT environment where a user equipment 12 may obtain service from multiple base stations (BSs) 14 that offer different radio access technologies (RATs). For example, one base station offers one RAT, DVB-H, on frequency band F1.1. Another base station offers two RATs, GSM on frequency band F2.1 and UMTS on frequency band F2.2. The remaining base station offers three RATs, WiFi on frequency band F3.1, GSM on frequency band F3.2, and UMTS on frequency band F3.3. As the question marks above the UE 12 indicate, one problem is to determine how to inform UEs about the specific RAT offerings and associated frequency bands.

One way to distribute information in radio environments with multiple RATs in a geographic region so that UEs can determine available RATs and how to connect to them is to use a Cognition enabling Pilot Channel (CPC). A wide-area, out-of-band CPC transmitter broadcasts, using a particular RAT and frequency already known to the UEs, information identifying which RATs (e.g., GSM, UMTS, W-CDMA, LTE, WiFi, and/or WiMax, etc.) are available and at what different frequencies in the different locations in a coverage area served by the CPC transmitter. The CPC transmitter may transmit using different frequencies than the frequencies used by the RATs and for that reason may be called an out-of-band wide area CPC transmitter.

One example way of dividing a wide-area radio access information coverage area up is in quadratic area elements like the mesh shown in FIG. 2. A wide area radio access information broadcast transmitter 18 transmits information for all of the mesh areas included in a service area 10. The wide area transmitter 18 transmits information for each mesh element "i" that includes location information of the mesh element, operator information, RAT information, frequency ranges associated with each RAT, and whether secondary usage is allowed and under what rules. Secondary usage refers to a situation where a UE is allowed to operate in a frequency band licensed to a certain RAT and/or operator but without connecting to that RAT and/or operator. Instead, the UE uses the frequency band for other communication purposes, e.g., for device-to-device communication with another party. Generally, secondary usage of frequency bands assumes that the UE (secondary user) somehow ensures that the quality of the primary service offered on the band is not degraded due to interference caused by the secondary usage.

With the introduction of more flexible and adaptable connection possibilities in UEs and the more dynamic spectrum arena that is likely to become reality in the future, the market for the introduction of local Dynamic Spectrum Access (DSA) hotspots becomes more attractive. A hotspot is a radio base station with small coverage and typically high capacity; one example is a WiFi hotspot at a coffee shop. A hotspot may, by using dynamic spectrum access mechanisms for example, obtain access to spectrum bands with more favorable propagation characteristics than provided by today's ISM band. Moreover, DSA hotspots could use discontiguous spectrum and aggregate a large bandwidth allowing for very high throughput.

To connect to a hotspot today, e.g., a WLAN hotspot, a UE needs to scan for hotspots in a limited frequency range. Even though the hotspot frequency band and the RAT used by the hotspot are already established, this UE scanning is still rather slow and power consuming. But if DSA is used, a UE wanting to connect to a DSA hotspot has even less information on where, in frequency, to scan for the hotspot or on what RAT is used by the DSA hotspot. The effect is a significant increase in the average scanning time and hence in connection time for users wanting to connect to the DSA hotspot resulting in lower user satisfaction, which is a significant drawback for the usefulness of hotspots.

To better attract users, it would be desirable for a DSA hotspot to efficiently announce its presence to nearby UEs and for UEs to be able to quickly connect to the hotspot without a time and energy consuming spectrum scanning.

The CPC could solve these problems by announcing to a UE on what frequencies it can connect to the hotspot and what RATs the hotspot is using. However, a wide-area CPC transmitter like that shown in FIG. 2 will have problems coping with many local DSA hotspots because of the large amount of information processing and transmission involved.

Furthermore, a wide-area CPC approach requires some degree of UE positioning meaning that a UE needs to know which CPC information is relevant for its present location. Since a hotspot typically has a small coverage area, that positioning has to be rather precise. Particularly for indoor use, which is where many hotspots are expected to be located, this could be a problem because GPS and similar positioning systems do not work indoors. Setting a high requirement on positioning precision may also be limiting to outdoor users since more complex UEs might be required (e.g., integrated GPS).

Another problem is that as local DSA hotspots change their operating frequencies and/or change the RAT(s) used to a dynamic local (in both time and space) frequency spectrum situation, it will be difficult to keep this information updated in a wide-area CPC transmitter.

SUMMARY

The technology described in this application solves these and other problems using local radio access information transmitters.

One aspect of the technology includes a local radio access information transmitter for use in a communications area serviced by multiple different radio access technologies (RATs) allocated to different radio resources in different locations in the communications area. Each RAT is associated with one or more RAT radio transceivers for serving user equipments (UEs) at least in some portion of the communications area using one of the multiple RATs. The local radio access information transmitter is in addition to the RAT radio transceivers and is located near an associated hotspot service area at least partly inside the communications area. The local radio access information transmitter determines local radio access information including one or more different RATs available for UE service in the hotspot service area and a frequency or frequencies of operation allocated to each RAT in the hotspot service area, sends a registration message to a remote wide area radio access information controller, and based on a response from the wide area radio access information controller, determines what radio resources to use to transmit the local radio access information signals. Radio transmission circuitry transmits the local radio access information signals for receipt by UEs in the hotspot service area using the determined radio resources.

In one example application, the determined radio resources include a local radio access information frequency that is different than RAT frequencies allocated to the different multiple RATs.

In one non-limiting example embodiment, the local radio access information transmitter is included with hotspot transmitting circuitry, and in another embodiment, it is separate from the hotspot transmitting circuitry.

In one non-limiting example embodiment, the determined radio resources are assigned by a wide area radio access information controller managing one or multiple local radio access information transmitters in the communications area.

In one non-limiting example embodiment, the determined radio resources are the same as radio resources used by a wide area radio access information transmitter. In another non-limiting example embodiment, determined radio resources are different from radio resources used by a wide area radio access information transmitter.

In one non-limiting example embodiment, local radio access information transmitter is a cognition enabling pilot channel (CPC) transmitter and/or the wide area radio access information transmitter is a CPC transmitter. The hotspot service area is a region surrounding a dynamic spectrum access (DSA) hotspot device.

Another aspect of the technology includes a wide area radio access information transmitter (WARAIT) for use in a WARAIT communications area serviced by multiple different radio access technologies (RATs) allocated to different radio resources in different locations in the communications area. Each RAT is associated with one or more RAT radio transceivers for serving user equipments (UEs) at least in some portion of the communications area using one of the multiple RATs. The wide area radio access information transmitter includes processing circuitry that determines wide area radio access information including different RATs available for UE service in different locations in the communication area and one or more frequencies of operation allocated to each RAT in each location. Transmission circuitry transmits the wide area radio access information over the communications area. Associated radio resource allocations are determined for at least some of the multiple local radio access information transmitters associated with one or multiple hotspot service areas inside the communications area. Registration messages are received from the multiple local radio access information transmitters and are responded to with the determined associated radio resource allocation for the local radio access information transmitters.

In one non-limiting example embodiment, the local radio access information transmitter is a cognition enabling pilot channel (CPC) transmitter and/or the wide area radio access information transmitter is a CPC transmitter, and the hotspot service area is a region surrounding a dynamic spectrum access (DSA) hotspot device.

In one non-limiting example embodiment, the communications area is divided into multiple location or sub areas, and the wide area radio access information also includes location area information along with the RATs and radio resources information available in that location area.

The radio resource allocations can be time slots, frequencies, or codes, or a combination of time slots, frequencies, or codes.

In one non-limiting example embodiment, local radio access information provided from at least one of the local radio access information transmitters to the transmission circuitry may be transmitted with the wide area radio access information over the communications area.

The wide area radio access information transmitter can use wire, optical, or wireless communications to communicate with the multiple local radio access information transmitters.

DETAILED DESCRIPTION

Figure 1:
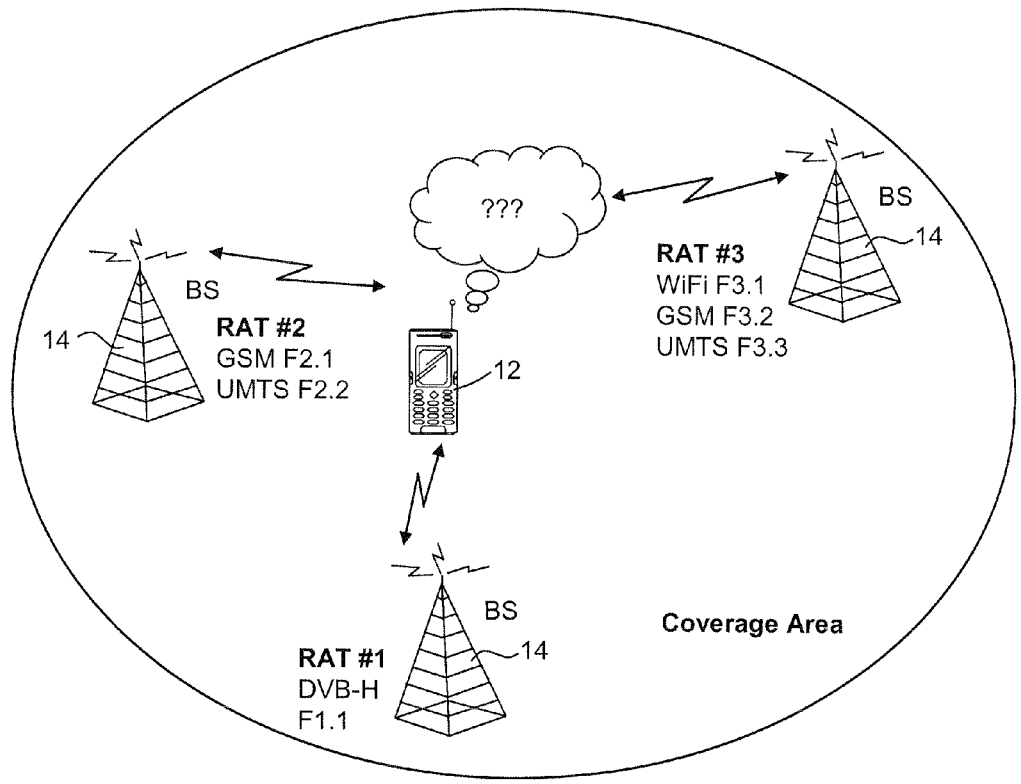
FIG. 1 illustrates a non-limiting example of a heterogeneous RAT environment where a user equipment may obtain service using different radio access technologies (RATs)

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 2:
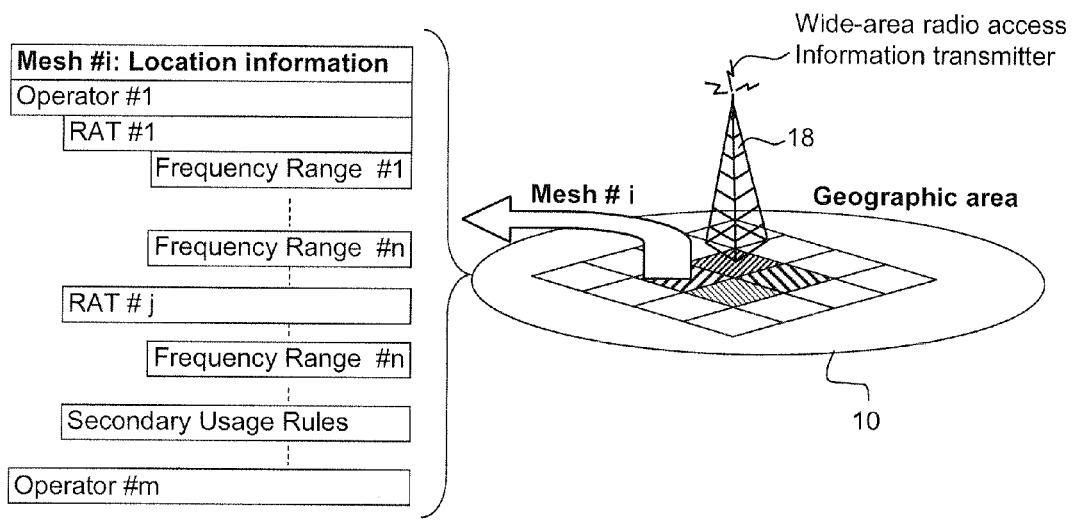
FIG. 2 illustrates a mesh of locations areas that may be used by a wide area radio access information transmitter (WARAIT) to inform UEs about available RATs and associated frequencies for a particular mesh element/location.
Figure 3A:
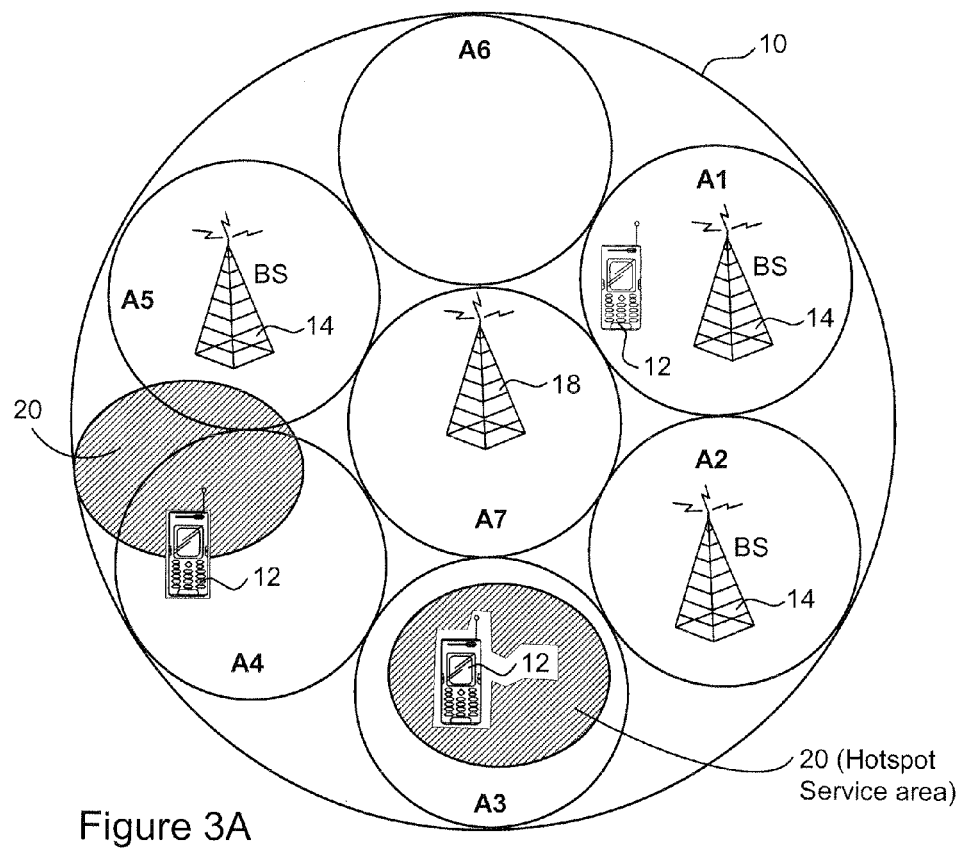
FIG. 3A is a non-limiting example diagram showing a service area of a WARAIT with multiple areas (similar to multiple mesh elements) and two hotspots service areas.

FIG. 3A is a non-limiting example diagram showing a WARAIT service area 10 of the WARAIT 18 with multiple smaller areas A1-A7 and two hotspot service areas 20. The smaller areas A1-A7 may be like the multiple mesh elements used to partition the service area of the WARAIT as shown in FIG. 2 or each smaller area be could correspond to a service area of a base station or a RAT. One hotspot service area is shown overlapping two smaller areas A5 and A4, and the other is contained within one smaller area A3. More or fewer hotspots may be present. The size of the service area of the hotspot may be on the same order as that of a smaller area, but not necessarily. Multiple base stations (BSs) 14 are shown in the WARAIT service area in example smaller areas A1, A2, and A5 and use different radio access technologies (RATs). Non-limiting examples of different RATs are shown in FIG. 1. Each RAT is associated with a corresponding frequency or frequencies. The term base station is only used for convenience and encompasses any suitable radio transceiver that communicates using a RAT like access points, NodeBs, eNodeBs, etc. While every smaller area A1-A7 could be associated to the coverage of a base station, another scenario is that a base station provides service for multiple smaller areas. In FIG. 3A, for example, the base station 14 in area A5 might provide service to smaller areas A5, A4, A6, and/or A7.

Also in the WARAIT service area 10 is a wide area radio access information transmitter 18 that transmits over the WARAIT service area 10, wide area radio access information for each of the smaller areas A1-A7 in the WARAIT service area 10. The wide area radio access information transmitter 18 preferably broadcasts, using a particular RAT at a particular frequency, information identifying which RATs (e.g., GSM, UMTS, W-CDMA, LTE, WiFi, and/or WiMax, etc.) are available at what frequencies in each smaller area A1-A7. Although not necessary, the wide area radio access information transmitter 18 preferably transmits using a different frequency than the frequencies used by the RATs that are available to provide service in the WARAIT service area 10. If this is the case, the wide area radio access information transmitter 18 may be called an out-of-band wide area transmitter. By tuning to the wide area radio access information transmitter's transmissions, UEs 12 can determine the available RATs and associated frequencies for the area(s) of interest to the UEs, e.g., near the respective UE.

Although frequencies are used as examples of radio resources, different types of radio resources may be used by the wide area transmitter 18 for transmitting the radio access information relating to different areas such as frequencies, time periods, codes, antennas, etc. For example, a timeslot "a" could be used to transmit information on which RATs are available in an associated smaller area, timeslot "b" could transmit information related to a different smaller area, and so on.

Figure 3B:
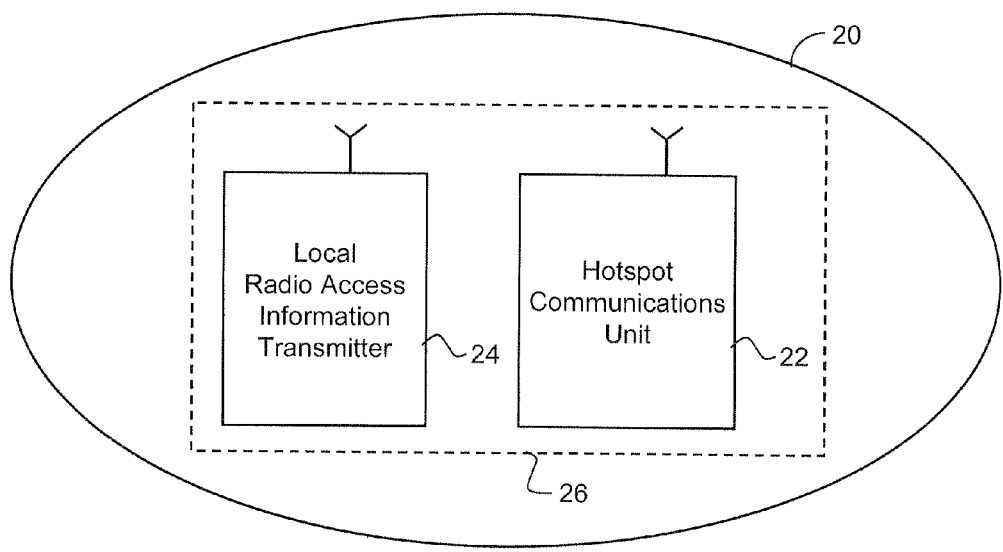
FIG. 3B is a non-limiting example diagram of a hotspot with a hotspot communications unit and local radio access information transmitter.

FIG. 3B is a non-limiting example diagram of a hotspot service area 20 from FIG. 3A and includes a hotspot communications unit 22 and local radio access information transmitter 24. The hotspot communications unit 22 includes one or more radio transceivers and typically (though not necessarily) uses one RAT and one or more associated frequencies. The local radio access information transmitter 24 is preferably inexpensive and co-located with the hotspot communications unit 22. It may be located separately from the hotspot communications unit 22, or it may be co-located with the hotspot communications unit 22 as shown by the dotted box 26, or even integrated in the hotspot communications unit 22 and possibly using, at least partly, the same hardware, such as transmit antenna. The local radio access information transmitter 24 transmits radio access (RA) information on how to connect to the local DSA hotspot 22 including information a UE needs to establish a connection to the RAT(s) that the hotspot is currently using such as the RAT(s) and its associated frequenc(ies). Preferably though not necessarily, the local radio access information transmitter 24 transmits on an out-of-band frequency that is different from the frequenc(ies) used by the RAT(s).

It will be appreciated that a WARAIT service area 10 may well have many local radio access information transmitters 24. Each local radio access information transmitter 24 communicates with a controller in the wide-area radio access to information transmitter 18 associated with the WARAIT service area 10. As a result, the wide-area radio access information transmitter 18 controller can control and coordinate the local radio access information transmitters 24 so that their transmissions preferably do not interfere with each other or with the wide-area radio access information transmitter transmissions. In this way, many local radio access information transmitters 24 can effectively coexist in the WARAIT service area 10. Although the WARAIT controller is assumed to be co-located with the wide area radio access information transmitter in the description, it need not be.

A UE 12 in or near the hotspot service area 20 can quickly detect, receive, and decode the local radio access information signal from the local radio access information transmitter 24 and use that information to connect to the local hotspot 22 without having to scan multiple frequencies associated with other hotspots and/or base stations that the UE 12 will likely not want to use. This eliminates the time and battery consuming scanning process described in the background section.

Figure 4:
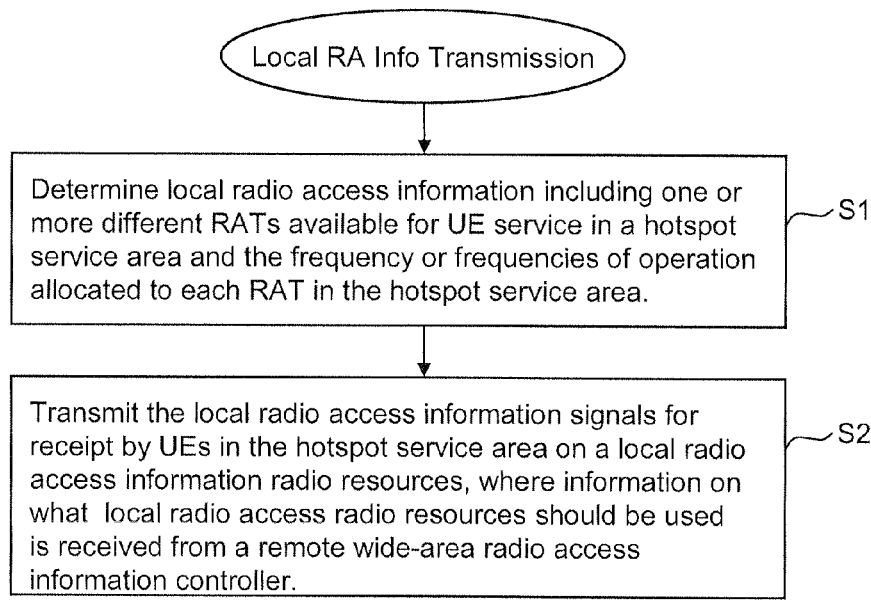
FIG. 4 illustrates a flowchart diagram with non-limiting example procedures for local radio access information transmission.

FIG. 4 illustrates a flowchart diagram with non-limiting example procedures for local radio access information transmission. In step S1, local radio access information is determined including one or more different RATs available for UE service in the vicinity of a hotspot service area within the WARAIT service area 10 and a frequency or frequencies of operation allocated to each RAT in the hotspot service area. The local radio access information signals are transmitted for receipt by UEs in the hotspot service area on local radio access information radio resources (step S2). The information on what local radio access information radio resources should be used is received from a remote wide area radio access information controller, e.g., like the wide area radio access information transmitter 18 in FIG. 3A. Alternatively, that information could be known beforehand by the UE, e.g., standardized.

Figure 5:
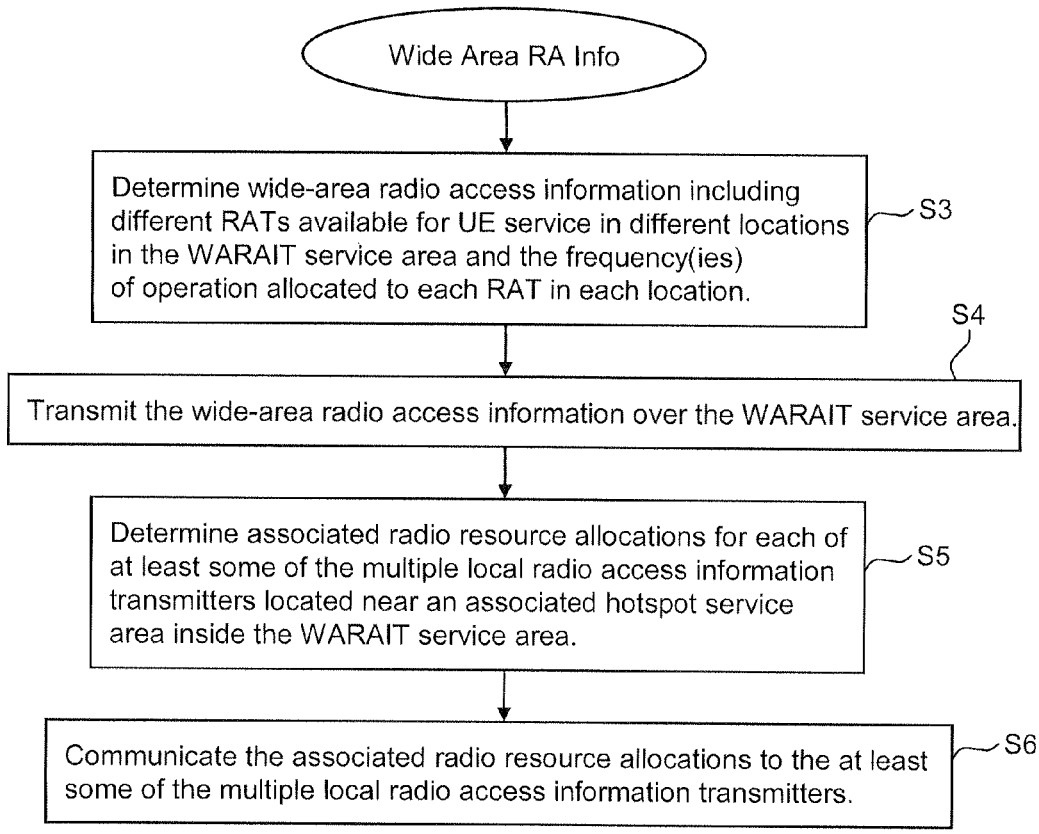
FIG. 5 illustrates a flowchart diagram with non-limiting example procedures for wide area radio access information transmission.

FIG. 5 illustrates a flowchart diagram with non-limiting example procedures for wide area radio access information transmission. Wide area radio access information is determined that includes different RATs available for UE service in different locations of the WARAIT service area and one or more frequencies of operation allocated to each RAT in each location (step S3). The wide area radio access information is transmitted over the WARAIT service area (step S4). Radio resource allocations for at least some of the multiple local radio access information transmitters associated with a hotspot service area inside the WARAIT service area are determined (step S5). The associated radio resource allocations are communicated to the at least some of the multiple local radio access information transmitters (step S6). Steps S3 and S4 need not be performed together with steps S5 and S6 because steps S3 and S4 are independent from steps S5 and S6.

Figure 6:
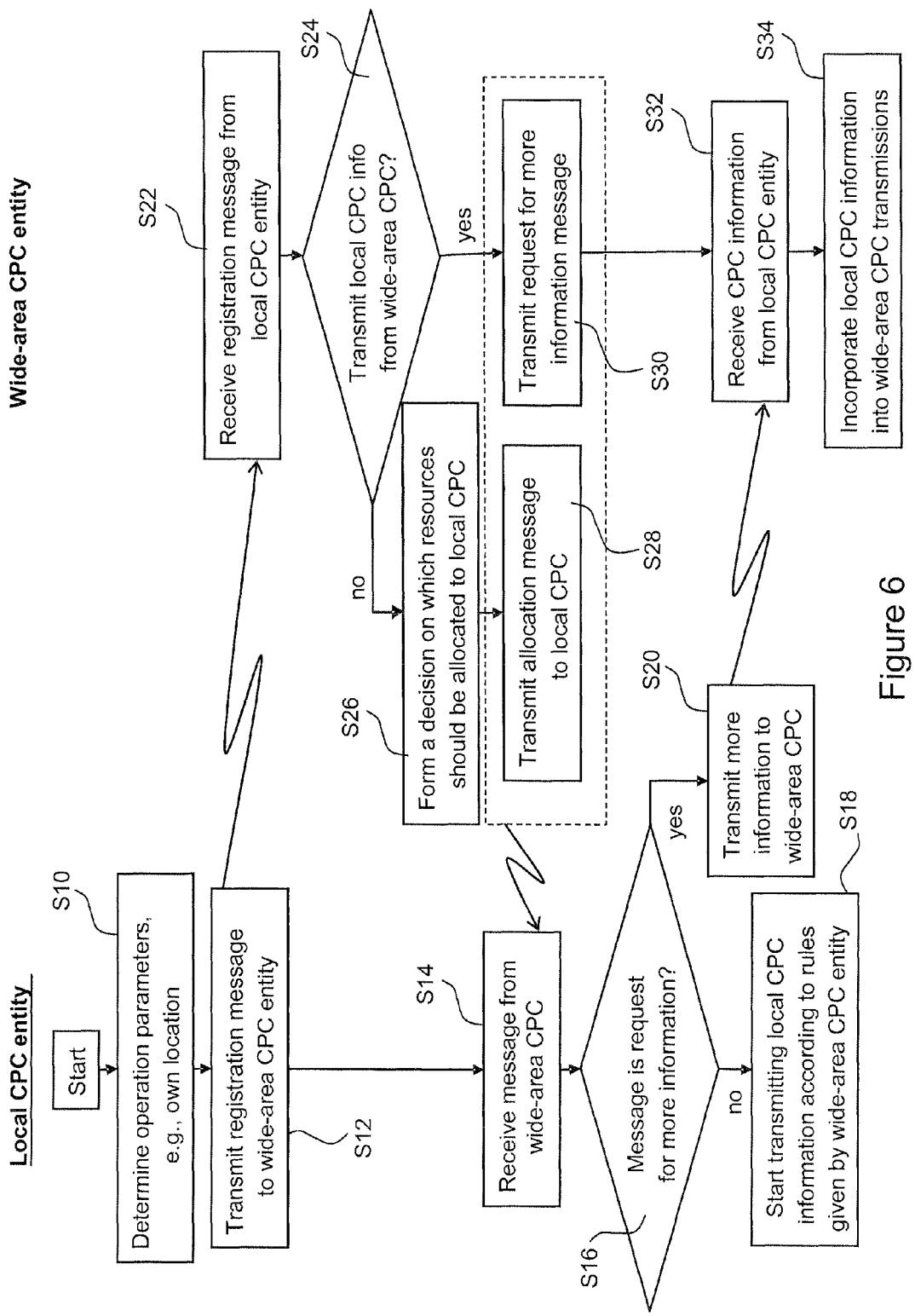
FIG. 6 illustrates a flowchart diagram with non-limiting example procedures for a local radio access information transmitter communicating with a wide area radio access information transmitter.

FIG. 6 illustrates a flowchart diagram with non-limiting example procedures for a local radio access information transmitter communicating with a wide area radio access information transmitter. In this non-limiting example embodiment, each local area radio access information transmitter registers its presence with the wide-area radio access information transmitter controller and requests radio resources from the wide-area radio access information transmitter controller (which may be the licensed or primary user) for transmitting its information. With this approach, the wide-area radio access information transmitter can control the spectrum for radio access information transmission and ensure that multiple local radio access information transmitters share radio resources in a fair or other desired manner. In this non-limiting example, the wide-area radio access information transmitter is a wide-area Cognition enabling Pilot Channel (CPC) transmitter or entity, and the local radio access information transmitter is a local CPC transmitter or entity for illustration purposes only.

As a first step, the local CPC transmitter sends a registration message to the wide-area CPC entity (step S10). This registration message may contain information such as, but not limited to, geographical position of the local CPC transmitter, the amount of requested resources for transmitting local CPC information, requested information transmission periodicity (i.e., how often should the local CPC transmitter be allowed to transmit), transmission scheme (e.g., a coded scheme, OFDM, etc.), life span of the local CPC transmitter (e.g., the local CPC transmitter only operates during a few hours or days (e.g., opening hours in a mall), is a permanent installation, etc.). The communications between the local CPC entity and the wide-area CPC entity may be sent over the air, by optical fiber, wire, or any other suitable communications medium.

When the wide-area CPC entity receives the registration message from a local CPC transmitter (step S22), it starts the process of determining the radio resources that should be allocated to the local CPC transmitter optionally along with perhaps other information like the number of RATs, area that is serviced, etc. First a decision is made whether the wide-area CPC entity will broadcast the hotspot information itself instead of the local CPC transmitter (step S24). An affirmative decision may be motivated for example if there are no appropriate radio resources for performing overlaying of the local CPC, and/or if the wide-area CPC entity wishes to avoid quiet periods (the overlay and quiet period example approaches are described below), and/or if the wide-area CPC transmitter can accommodate the hotspot information in its wide area transmissions without substantial impact. In that affirmative case ("yes"), the wide-area CPC entity transmits a request for "more information" message to the local CPC (step S30). Optionally, this "more information" could be included in the registration message transmitted in step S12 and received in step S22 if this additional information is useful for the wide-area CPC in step S24. After receiving a response to the request for more information (step S32), the wide-area CPC entity incorporates the local CPC information into its own wide-area CPC transmissions (step S34).

If the wide-area CPC entity decides to let the local CPC entity transmit its own information ("no" in step S24), then in step S26, the wide-area CPC entity decides which radio resources should be assigned to the local CPC transmissions. This could, e.g., be based on an overlay approach, a quiet period approach, or some other approach. In brief, the wide-area CPC entity for the overlay approach allocates some wide-area CPC radio resources associated to an area distant from the location of the local CPC transmitter. For the quiet period approach, the wide-area CPC itself does not use the CPC radio resources allocated to the local CPC transmitter for the quiet period. The wide-area CPC entity may also decide one or more other transmission parameter(s), e.g., maximum power, or put some requirement(s), on the transmissions from the local CPC transmitter. Furthermore, the wide-area CPC preferably considers and coordinates other local CPC transmitters when assigning radio resources to the requesting local CPC transmitter; e.g., if the quiet period approach is used, local CPC transmitters which are well separated may transmit in the same quiet period since there is a low risk that they interfere with each other's transmissions. In this manner the wide-area CPC control may significantly improve the resource sharing of many local CPC transmitters compared to a non-centrally controlled resource sharing.

The wide-area CPC entity then transmits an allocation message to the local CPC transmitter (step S28) that identifies the radio resources which may be used by the local CPC transmitter. The allocation message may also contain information such as, but not limited to, maximum output power of the local CPC transmitter, time during which the information in the response message is valid, schemes which should be used for resource sharing with other local CPC transmitters, and/or other information. One example is information identifying whether an overlay or quiet period approach is being used by the wide-area CPC entity.

When the local CPC entity receives the response message from the wide-area CPC entity (step S14), the local CPC entity determines whether the message is a request for more information (step S16). If not, the local CPC entity may begin transmitting its local CPC information subject to the constraints given by the information in the response message (step S18). If desired, (but not necessary), the registration may only be valid for a limited time period. In that case, when the registration becomes or is close to becoming invalid by timing out, the local CPC entity can transmit a new registration message to continue operation.

If the local CPC entity receives a request for more information message from the wide-area CPC entity, i.e., the wide-area CPC entity wants to incorporate the local area CPC information in its own transmissions, the local CPC may choose to respond to such a message with the requested information. Alternatively, the local CPC may not want to share this information with the wide-area CPC entity, and in this case, the local CPC may transmit a new registration message to the wide-area CPC entity at a later time. If the local CPC entity decides to reply with more information (step S20), this information may be basically, but not necessarily, the same as what the local CPC entity would transmit if it instead was assigned radio resources from the wide-area CPC entity. The reply may contain different information perhaps because of possible limits in the wide-area CPC control unit or because of unwillingness from the local area CPC entity to provide the complete set of information to the wide-area CPC entity. For example, the reply could contain information on what RATs are used by the local CPC entity at what frequencies and bandwidths. The message may also contain information is such as for how long the hotspot intends to use this configuration. Other information related to the associated hotspot may be transmitted as well.

For some locations, such as train stations, airports, etc., where the user density is high, several hotspots, who all want to announce their presence using local outband CPC transmitters, may be present. If these hotspots are close, some resource sharing is preferable to reduce the chances of collisions between the local CPC transmissions. The wide-area CPC entity's control of the local CPC transmitters can significantly improve coexistence of several local CPC transmitters in these and other situations as compared to a non-centrally controlled resource sharing.

Figure 7:
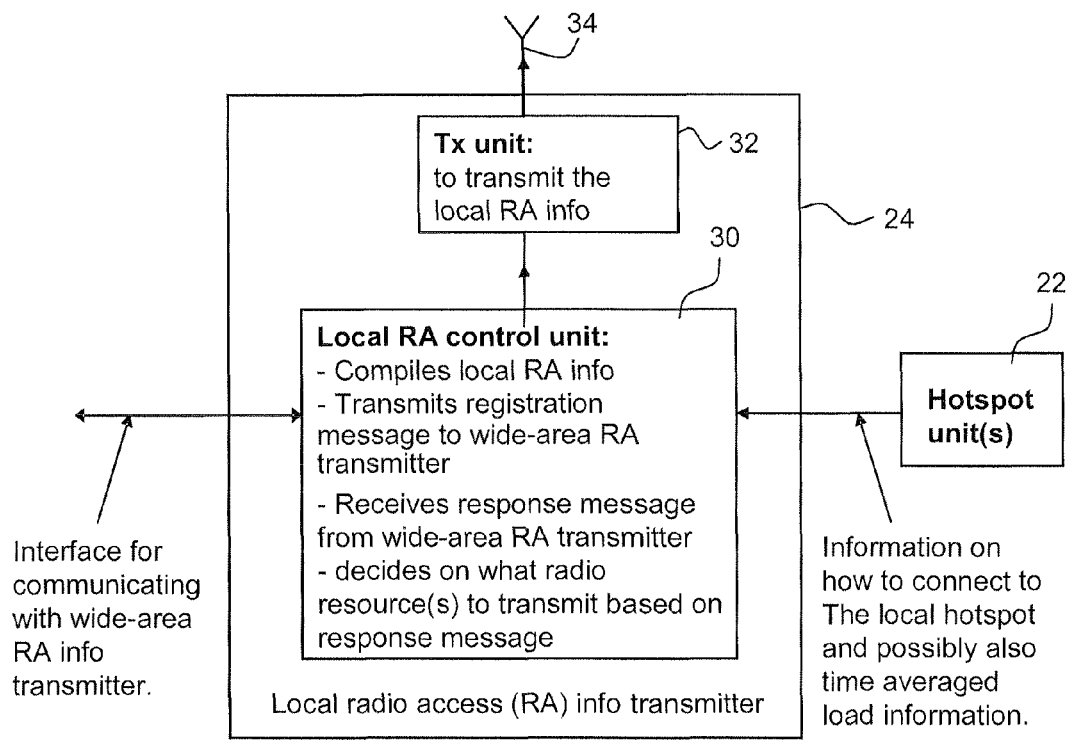
FIG. 7 illustrates a non-limiting example function block diagram of local radio access information transmitter.

FIG. 7 illustrates a non-limiting example function block diagram of local radio access (RA) information transmitter 24. The local radio access information transmitter 24 includes a transmitter unit 32 coupled to one or more antennas 34 which in certain embodiments could be shared with the associated hotspot unit 22. A local control unit 30 is coupled to the transmitter 32, to an interface for communicating with a wide area radio access information transmitter, and an interface for communicating with one or several hotspot unit(s) 22. The hotspot unit 22 may provide information on how to connect and possibly also time averaged load information which could be relevant information for the UE for finding a connection with available resources. The local control unit 30 compiles local radio access information for local broadcast via the transmitter unit 32 and antenna(s) 34. It also generates and forwards for transmission a registration message to the wide area RA transmitter and decides on what radio resource (s) to use for the local RA information broadcast based on the response. In one non-limiting example embodiment, the local radio access information transmitter could be a local CPC transmitter.

Figure 8:
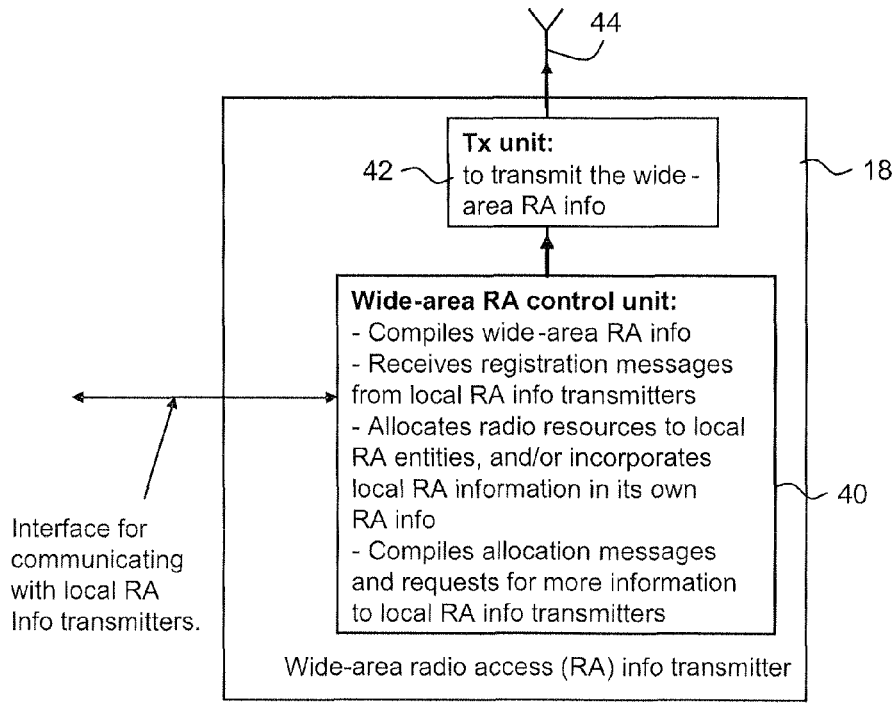
FIG. 8 illustrates a non-limiting example function block diagram of wide area radio access information transmitter.

FIG. 8 illustrates a non-limiting example function block diagram of to wide area radio access information transmitter 18. The wide area radio access information transmitter 18 includes a transmitter unit 42 coupled to one or more antennas 44. A wide area radio access (RA) control unit 40 is coupled to the transmitter 42 and to an interface for communicating with a local radio access information transmitters. The wide area RA control unit 40 could also be an external device connected to the WARAIT. The wide area control unit 40 compiles wide area radio access information for wide area broadcast via the transmitter unit 42 and antenna(s) 44. It also receives registration messages from the local RA information transmitters and allocates radio resource(s) for them to use for the local RA information broadcast. The wide area control unit 40 may also incorporate the local RA information from one or more local RA information transmitters into its own wide area RA information. The wide area control unit 40 compiles allocation messages and/or requests for more information to local RA information transmitters. In one non-limiting example embodiment, the wide area radio access information transmitter could be a wide area CPC transmitter.

Assuming CPC transmitters as WARAIT and LARAIT examples for the sake of the following description, a local CPC transmitter may, for its transmissions of the local. CPC information, use a specified/standardized unlicensed frequency (e.g., a possible future version of the ISM band) or a dedicated licensed outband wide-area CPC frequency band, where the signal is either overlayed (i.e., transmitted at the same time as the wide area CPC signal) with the wide-area outband CPC signal, or transmitted during certain radio resources where the wide-area outband CPC is quiet (e.g., with the purpose of allowing local CPC transmitters to operate on these resources). Wide-area CPC information associated to separate areas may be transmitted on separate radio resources, e.g., separate time slots, possibly of different durations, different codes, frequencies, antennas, etc.

Figure 9:
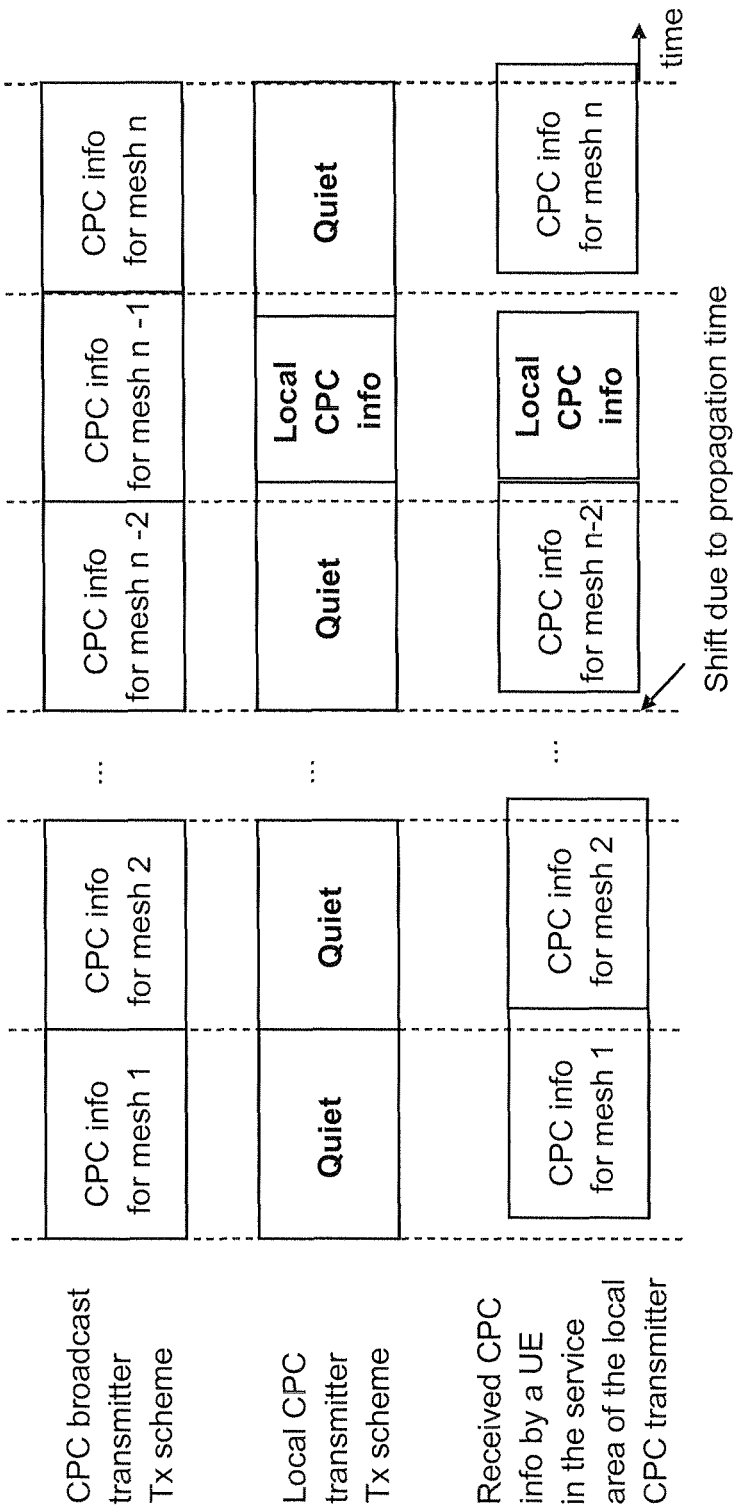
FIG. 9 illustrates one non-limiting example technique for allocating radio resources to local radio access information transmitters.

FIG. 9 illustrates one non-limiting overlay example technique for allocating radio resources to local radio access information transmitters. The local outband CPC transmission can be overlayed with the wide-area CPC transmissions using radio resources such that the wide-area CPC transmissions that are being overlaid contain information that is not relevant to the local geographic area around the hotspot (at least the hotspot service area), e.g., the information concerns an area far away. Namely, the local CPC transmitter transmits its local CPC information on the radio resources only when the wide-area CPC transmitter transmits information related to areas which are located relatively far from the local outband CPC transmitter and its associated hotspot. The result of this overlay allocation approach is that the information that contains the CPC information of areas which are far away from the UE position will not be decodable from the wide-area CPC signal. However, this information is most likely not interesting for the UE anyway. Thus, after each local CPC transmitter announces itself to the wide-area CPC entity, the wide-area CPC entity can assign radio resources to the local CPC transmitters which do not severely interfere with one another or with the wide-area CPC transmissions containing, for a UE in the vicinity of the local CPC transmitter, important information. Note that the local CPC transmitter can adapt its coding to better cope with the interference from the wide area CPC transmitter that will be present in this case. This is possible if e.g., the local CPC transmitter knows whether an overlay or quiet period radio resource approach is being used.

The example in FIG. 9 assumes an outband mesh CPC transmission scheme with n meshes. In this example, the mesh number n−1 is allocated to the local CPC transmitter by the wide-area CPC entity, and hence, this is where the local CPC information is transmitted. This technique is equally applicable for situations where the time slots are not of equal length or where other radio resources than time slots are used for the CPC transmissions. For example, if the local CPC information is encoded to better cope with the wide-area CPC signal interference, the local CPC information slot could stretch over multiple meshes for the wide area CPC information. Although the wide-area CPC transmitter uses a time slotted transmission scheme in FIG. 9, the wide-area CPC transmitter may be designed so that different parts of the spectrum band are associated with different geographical regions, different codes are associated with different geographical regions, or any combination of these and/or the time slotted structure described above. In other words, some radio resources are associated with different geographical regions, and the radio resources which correspond to information which concerns geographical regions which are far away from the local CPC transmitter can be used in the described overlay fashion.

Figure 10:
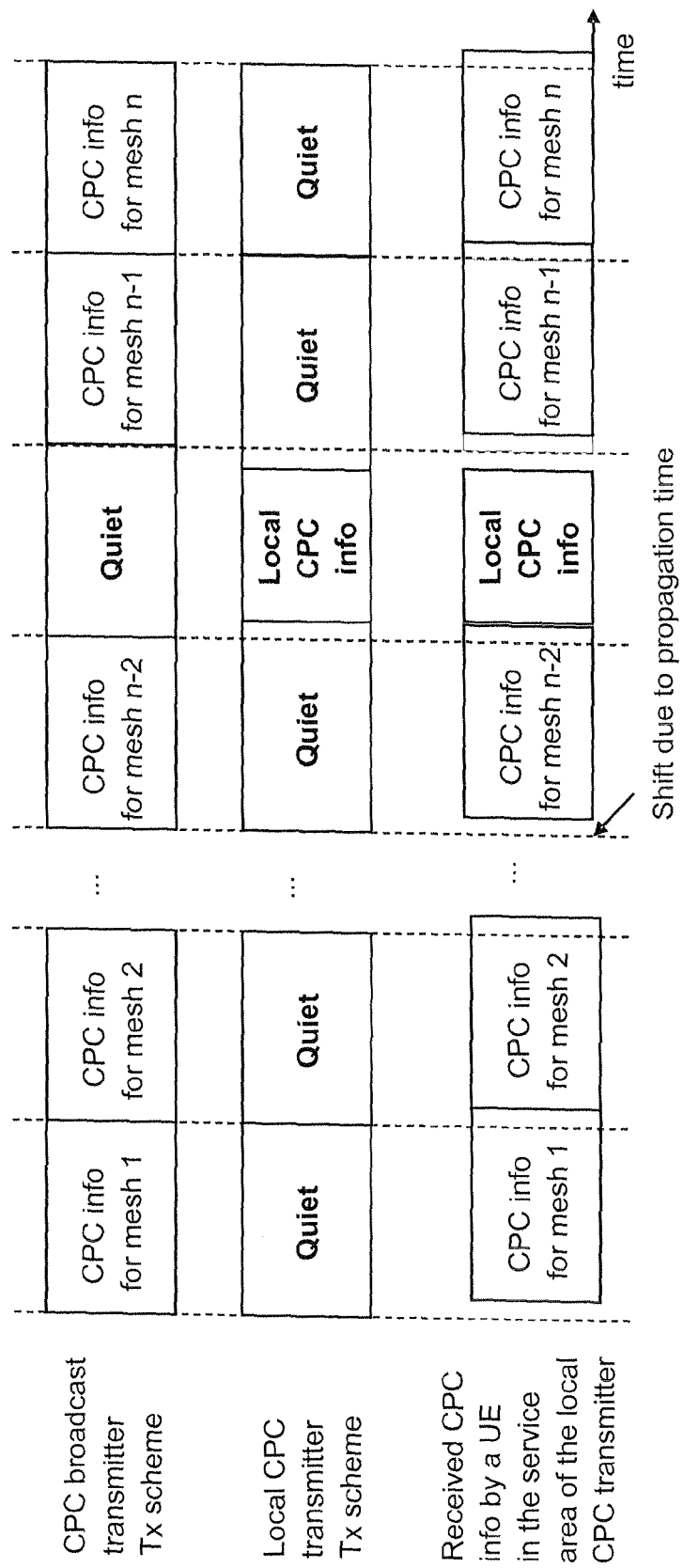
FIG. 10 illustrates another non-limiting example technique for allocating radio resources to local radio access information transmitters.

FIG. 10 illustrates another non-limiting example: a "quiet period" technique for allocating radio resources to local radio access information transmitters. The wide-area CPC transmitter (meshed or not) can choose to introduce silent periods when it keeps quiet, i.e., ceases to transmit over some radio resources. These quiet periods may then be used by local CPC transmitters to transmit their local CPC information in an interweaved fashion.

In contrast to the overlay approach, the receiving UEs obtain all of the wide area CPC data sent from the wide area CPC transmitter as well as the local CPC data sent from the local CPC transmitter. The price paid for this additional information is the slightly lower spectrum utilization by the wide-area CPC transmitter since it sometimes has to be "quiet." On the other hand, the local CPC information is not subject to interference from the wide-area CPC transmitter.

While the wide-area CPC transmitter is quiet during a specific time interval in the quiet period example embodiment, the wide-area CPC transmitter may be designed to leave a part of the spectrum band vacant (unused). This allows local CPC transmitters to transmit their information on this unused band. A dynamic wide-area CPC transmitter, for example, could then adapt its bandwidth and time utilization to the complexity of the current radio environment. For example, the wide-area CPC transmitter may leave some chunks of the time-frequency-code dimension vacant for local CPC transmitters.

After each local CPC transmitter announces itself to the wide-area CPC entity, the wide-area CPC entity assigns radio resources to the local CPC transmitters which do not overlap with the resources used by the wide-area CPC. Additionally, the wide-area CPC can make sure that the local CPC transmissions do not significantly interfere with one another, thereby coordinating the coexistence and resource sharing of many local CPC transmitters.

The technology in this application offers many advantages. The required information feedback to the wide-area radio access entity for transmission of connection information related to each of many hotspots is reduced because that connection information is transmitted by the local radio access (RA) information transmitter. The technology is semi-distributed the sense that the wide-area RA information entity does not need to know which information is to be transmitted from is each local RA entity. This allows excellent scaling when many local hotspots are introduced.

In addition, the technology incentivizes a hotspot operator interested in advertising its hotspot to invest in a local RA information transmitter so that a continuous fee may not have to be paid to a wide-area RA information operator. The local hotspot operator can be in full control of the local RA information.

If the local RA information transmitter is connected to the hotspot, it can provide instantaneous load information in the local RA information messages it broadcasts which allows UEs to take this information into account when choosing where to connect, which can improve user experience and QoS. Otherwise, hotspot load information must be transferred to the wide-area CPC operator.

Another benefit is that UE positioning is not required. Whenever a UE can "hear" the local RA information broadcast, the UE is typically in the service area of the local hotspot and is thus able to connect to it.

Resource sharing by multiple local RA information transmitters can be efficiently coordinated by the wide-area RA information entity because the wide-area CPC RA information entity controls the CPC spectrum.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A local cognition enabling pilot channel (CPC) radio access information transmitter for use in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the local CPC radio access information transmitter being in addition to the RAT radio transceivers and located near an associated hotspot service area at least partly inside the communications area, the local CPC radio access information transmitter comprising:

processing circuitry configured to:
determine local CPC radio access information including one or more different RATs available for UE service in the hotspot service area and a frequency or frequencies of operation allocated to each RAT in the hotspot service area,
send a registration message to a wide area CPC radio access information transmitter that is geographically separated from the local CPC radio access information transmitter and that transmits, at a sufficiently high transmit power level in order to be received over substantially all of the communications area, wide area CPC radio access information for each of multiple smaller service areas in the communications area, and that decides whether to transmit local CPC radio access information,
determine if a request message is received from the wide area CPC radio access information transmitter requesting local CPC radio access information from the local CPC radio access information transmitter in addition to and different from information in the registration message, and if so, to transmit to the wide area CPC radio access information transmitter the requested local CPC radio access information from the local CPC radio access information transmitter,
when the request message is not received requesting the local CPC radio access information from the local CPC radio access information transmitter, then based on a response from the wide area CPC radio access information transmitter to the registration message, determine what radio resources to use to transmit the local CPC radio access information signals, and
radio transmission circuitry configured to transmit, at lower power than the high transmit power used by the wide area CPC radio access information transmitter, the local CPC radio access information for receipt by UEs in the hotspot service area using the determined radio resources, where the lower power is designed for satisfactory reception by UEs inside the hotspot service area but for less than satisfactory reception by UEs outside the hotspot service area,
wherein the determined radio resources are assigned by the wide area CPC radio access information transmitter managing one or multiple local CPC radio access information transmitters in the communications area.

2. The local CPC radio access information transmitter in claim 1, where the determined radio resources include a local radio access information frequency that is different than RAT frequencies allocated to the different multiple RATs.

3. The local CPC radio access information transmitter in claim 1, wherein the local CPC radio access information transmitter is included with hotspot transmitting circuitry or is separate from the hotspot transmitting circuitry.

4. The local CPC radio access information transmitter in claim 1, wherein the determined radio resources are the same as radio resources used by the wide area CPC radio access information transmitter.

5. The local CPC radio access information transmitter in claim 1, wherein the determined radio resources are different from radio resources used by the wide area CPC radio access information transmitter.

6. The local CPC radio access information transmitter in claim 1, wherein the hotspot service area is a region surrounding a dynamic spectrum access (DSA) hotspot device.

7. A method for use in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the method comprising:

a local cognition enabling pilot channel (CPC) radio access information transmitter determining local CPC radio access information including one or more different RATs available for UE service in a hotspot service area within the communications area and a frequency or frequencies of operation allocated to each RAT in the hotspot service area,
the local CPC radio access information transmitter sending a registration message to a remote wide area CPC radio access information transmitter that is geographically separated from the local radio access information transmitter and that transmits, at a sufficiently high transmit power level in order to be received over substantially all of the communications area, wide area CPC radio access information for each of multiple smaller service areas in the communications area, and that decides whether to transmit local CPC radio access information,
determining if a request message is received from the wide area CPC radio access information transmitter requesting local CPC radio access information from the local CPC radio access information transmitter in addition to and different from information in the registration message, and if so, transmitting to the wide area CPC radio access information transmitter the requested local CPC radio access information from the local CPC radio access information transmitter,
when the request message is not received requesting the local CPC radio access information used by the local CPC radio access information transmitter, then based on a response from the wide area CPC radio access information transmitter to the registration message, the local CPC radio access information transmitter determining what radio resources to use to transmit local radio access information based on a resource assignment from a wide area CPC information controller managing one or multiple local CPC radio access information transmitters in the communications area, and
the local CPC radio access information transmitter then transmitting, at lower power than the high transmit power used by the wide area CPC radio access information transmitter, the local CPC radio access information for receipt by UEs in the hotspot service area using the determined radio resources, where the lower power is designed for satisfactory reception by UEs inside the hotspot service area but for less than satisfactory reception by UEs outside the hotspot service area.

8. The method claim 7, wherein the determined radio resources include a local radio access information frequency that is different than RAT frequencies allocated to different ones of the multiple RATs.

9. The method claim 7, wherein the determined radio resources are received from the remote wide area CPC radio access information transmitter.

10. A wide area cognition enabling pilot channel (CPC) radio access information transmitter for use in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the wide area CPC radio access information transmitter comprising:

processing circuitry configured to determine wide area CPC radio access information including different RATs available for UE service in different locations in the communication area and one or more frequencies of operation allocated to each RAT in each location and to decide whether to transmit local CPC radio access information from the wide area CPC radio access information transmitter;

transmission circuitry configured to transmit the wide area radio access information at a sufficiently high transmit power level in order to be received over the communications area, wherein the processing circuitry is further configured, when the decision is to transmit local CPC radio access information from at least one local area CPC radio access information transmitter, to determine associated radio resource allocations for the at least one local CPC radio access information transmitter geographically separated from the wide area CPC radio access information transmitter and associated with a hotspot service area inside the communications area, where the local CPC radio access information transmitters transmit at a lower power level than the wide area CPC radio access information transmitter, the lower power level being designed for satisfactory reception by UEs inside the hotspot service area but for less than satisfactory reception by UEs outside the hotspot service area; and a communications interface configured to receive registration messages from the multiple local CPC radio access information transmitters and provide the registration message to the processing circuitry, wherein the processing circuitry is configured to respond, via the communications interface, to one or more of the registration messages with the determined associated radio resource allocation for each of the local CPC radio access information transmitters, wherein the processing circuitry is further configured, when the decision is to transmit local CPC radio access information from the wide area CPC radio access information transmitter, to transmit a request message to the at least one local CPC radio access information transmitter, requesting local CPC radio access information from the at least one local CPC radio access information transmitter in addition to and different from information in the registration message, and if so, to transmit from the wide area CPC radio access information transmitter at the high transmit power level local CPC radio access information received from the at least one local CPC radio access information transmitter.

11. The wide area CPC radio access information transmitter in claim 10, wherein the hotspot service area is a region surrounding a dynamic spectrum access (DSA) hotspot device.

12. The wide area CPC radio access information transmitter in claim 10, wherein the coverage area is divided into multiple location areas, the wide area radio access information also includes location area information along with the RATs and radio resources information available in that location area.

13. The wide area CPC radio access information transmitter in claim 10, wherein the radio resource allocations can be time slots, frequencies, or codes, or a combination of time slots, frequencies, or codes.

14. The wide area CPC radio access information transmitter in claim 10, wherein the processing circuitry is configured to provide local CPC radio access information received via the communications interface from the at least one local CPC radio access information transmitter to the transmission circuitry, and wherein the transmission circuitry is configured to transmit the wide area CPC radio access information and the received local CPC radio access information over the communications area.

15. The wide area CPC radio access information transmitter in claim 10, wherein the communications interface is configured to use wire or optical fiber communications to communicate with the multiple local CPC radio access information transmitters.

16. A method for use in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the method comprising:

a wide area cognition enabling pilot channel (CPC) radio access information transmitter determining wide area CPC radio access information including different RATs available for UE service in different locations in the communication area and radio resources allocated to each RAT in each location and deciding whether to transmit local CPC radio access information from the wide area CPC radio access information transmitter;

the wide area CPC radio access information transmitter transmitting the wide area radio access information at a sufficiently high transmit power level in order to be received over the communications area;

the wide area CPC radio access information transmitter receiving registration messages from multiple local CPC radio access information transmitters;

when the decision is to transmit local CPC radio access information from at least one local area CPC radio access information transmitter, the wide area CPC radio access information transmitter determining associated radio resource allocations for the at least one local area CPC radio access information transmitter associated with a hotspot service area inside the communications area, where the at least one local CPC radio access information transmitter transmits at a lower power level than the wide area CPC radio access information transmitter, the lower power level being designed for satisfactory reception by UEs inside the hotspot service area but for less than satisfactory reception by UEs outside the hotspot service area; and when the decision is to transmit local CPC radio access information from the wide area CPC radio access information transmitter, transmitting a request message to the at least one local CPC radio access information transmitter requesting local CPC radio access information from the at least one local CPC radio access information transmitter in addition to and different from information in the registration message, and if so, transmitting from the wide area CPC radio access information transmitter at the high transmit power level the received local CPC radio access information from the at least one local CPC radio access information transmitter.

17. The method in claim 16, wherein the determined radio resources are the same as radio resources used by a wide area CPC radio access information transmitter.

18. The method claim 16, wherein the determined radio resources are different from radio resources used by a wide area CPC radio access information transmitter.

19. The method claim 16, further comprising:

receiving local CPC radio access information from the at least one local CPC radio access information transmitter, and transmitting the wide area CPC radio access information and the received local CPC radio access information over the communications area.

\* \* \* \* \*

UNITED STATES PATENT AND TRADEMARK OFFICE
CERTIFICATE OF CORRECTION

| | | |
|---|---|---|
| PATENT NO. | : 9,037,175 B2 | Page 1 of 1 |
| APPLICATION NO. | : 12/881901 | |
| DATED | : May 19, 2015 | |
| INVENTOR(S) | : Kronander et al. | |

It is certified that error appears in the above-identified patent and that said Letters Patent is hereby corrected as shown below:

In the specification,

In Column 7, Line 24, delete "access to" and insert -- access --, therefor.

In Column 9, Lines 66-67, delete "information is" and insert -- information --, therefor.

In Column 10, Line 35, delete "of to" and insert -- of --, therefor.

In Column 10, Line 57, delete "local." and insert -- local --, therefor.

In Column 12, Line 30, delete "from is" and insert -- from --, therefor.

In the claims,

In Column 15, Line 6, in Claim 8, delete "method claim" and insert -- method in claim --, therefor.

In Column 15, Line 10, in Claim 9, delete "method claim" and insert -- method in claim --, therefor.

In Column 17, Line 18, in Claim 18, delete "method claim" and insert -- method in claim --, therefor.

In Column 17, Line 21, in Claim 19, delete "method claim" and insert -- method in claim --, therefor.

Signed and Sealed this
Fifteenth Day of March, 2016

Michelle K. Lee
*Director of the United States Patent and Trademark Office*